US011815071B1

(12) United States Patent
Wen et al.

(10) Patent No.: US 11,815,071 B1
(45) Date of Patent: Nov. 14, 2023

(54) GRAVITY COMPRESSED AIR ENERGY STORAGE SYSTEM

(71) Applicant: Xi'an Thermal Power Research Institute Co., Ltd, Shaanxi (CN)

(72) Inventors: Jun Wen, Shaanxi (CN); Yang Li, Shaanxi (CN); Hanchen Zhao, Shaanxi (CN); Chenglong Yang, Shaanxi (CN); Haimin Ji, Shaanxi (CN); Xiaohui Song, Shaanxi (CN); Haifeng Qin, Shaanxi (CN); Haiwei Huang, Shaanxi (CN); Shuchang Liu, Shaanxi (CN); Zaisong Yu, Shaanxi (CN)

(73) Assignee: XI'AN THERMAL POWER RESEARCH INSTITUTE CO., LTD, Shaanxi (CN)

( * ) Notice: Subject to any disclaimer, the term of this patent is extended or adjusted under 35 U.S.C. 154(b) by 0 days.

(21) Appl. No.: 18/329,862

(22) Filed: Jun. 6, 2023

(30) Foreign Application Priority Data

Jun. 8, 2022 (CN) .......................... 202210642239.3

(51) Int. Cl.
*F03G 3/00* (2006.01)
*F02C 6/16* (2006.01)

(52) U.S. Cl.
CPC ................ *F03G 3/096* (2021.08); *F02C 6/16* (2013.01)

(58) Field of Classification Search
CPC .......... F03G 3/087; F03G 3/094; F03G 3/096; H02J 15/006
See application file for complete search history.

(56) References Cited

U.S. PATENT DOCUMENTS

| 8,950,181 B2 * | 2/2015 | Ivy ........................... B65G 5/00 60/415 |
| 9,611,867 B2 * | 4/2017 | Ivy ............................. F03G 3/00 |
| 2015/0075173 A1 | 3/2015 | Berti et al. |

FOREIGN PATENT DOCUMENTS

| CN | 108980600 | 12/2018 |
| CN | 111237144 | 6/2020 |
| CN | 113550803 | 10/2021 |

(Continued)

OTHER PUBLICATIONS

CNIPA, First Office Action for CN Application No. 202210642239.3, dated Jul. 22, 2022.

(Continued)

*Primary Examiner* — Michael Leslie
(74) *Attorney, Agent, or Firm* — Hodgson Russ LLP

(57) ABSTRACT

The gravity compressed air energy storage system includes: a shaft, into which a pressure-bearing cylinder is movably inserted; a locking component arranged at a top of the pressure-bearing cylinder to support the pressure-bearing cylinder on a ground at a top of the shaft through the locking component in case that the pressure-bearing cylinder is at a lowest limit position; a primary gravity block arranged above the locking component; a spherical connection component arranged and spherically connected between the primary gravity block and the locking component; in which a plurality of guide components are arranged around the primary gravity block; and a plurality of guide rails arranged on the ground and at a peripheral side of the primary gravity block; in which the plurality of guide rails cooperate with the plurality of guide components.

8 Claims, 2 Drawing Sheets

(56) References Cited

FOREIGN PATENT DOCUMENTS

| CN | 114087046 |   | 2/2022 | | |
|----|-----------|---|--------|---|---|
| CN | 114198271 |   | 3/2022 | | |
| CN | 114718686 B | * | 8/2022 | ............... | F03G 3/00 |
| CN | 114718687 B | * | 8/2022 | ............... | F03G 3/00 |
| CN | 114718689 B | * | 8/2022 | ............... | F03G 3/00 |
| CN | 114718684 B | * | 9/2022 | ............... | F03G 3/00 |
| GB | 2014667 |   | 8/1979 | | |
| JP | 2000261987 |   | 9/2000 | | |
| JP | 2020067027 |   | 4/2020 | | |
| NL | 7702688 |   | 9/1977 | | |

OTHER PUBLICATIONS

CNIPA, Notification to Grant Patent Right for Invention for CN Application No. 202210642239.3, dated Jul. 29, 2022.

* cited by examiner

GRAVITY COMPRESSED AIR ENERGY STORAGE SYSTEM

CROSS-REFERENCE TO RELATED APPLICATION

This application claims priority to Chinese Patent Application No. 202210642239.3, filed Jun. 8, 2022, the entire disclosure of which is incorporated herein by reference.

FIELD

The present disclosure relates to an electric energy storage technical field, and more particularly to a gravity compressed air energy storage system.

BACKGROUND

Gravity compressed air energy storage is achieved by setting a gravity block in a shaft, and the gravity block is sealed and connected to the shaft through a sealing membrane to form a sealed gas storage chamber in the shaft below the gravity block, which is used for the storage of high-pressure gas. After compressing the air, the air is introduced into the gas storage chamber to convert the energy of the air compressed into the gravitational potential energy of the gravity block for storage. However, when the storage capacity is large, a larger weight of the gravity block is required. If the weight of the gravity block is directly increased by adjusting its height, the height of the gravity block will increase the difficulty of construction.

SUMMARY

The present disclosure aims to solve at least one of the technical problems in the related art at least to some extent.

In view of this, an object of the present disclosure is to provide a gravity compressed air energy storage device. By dividing gravity into an aboveground part and an underground part, the weight of the gravity block required for gas storage may be increased through the above ground part to reduce the height of the shaft, which greatly reduces the excavation quantity and difficulty of the shaft. In addition, the aboveground part is limited by setting guide rails, so that deviation does not occur. At the same time, the aboveground part and the underground part are connected through a spherical connection to adjust a center, so as to adapt to posture changes of the underground pressure-bearing cylinder without additional limit guidance on the pressure-bearing cylinder, which reduced complexity of a ground system.

The present disclosure provides a gravity compressed air energy storage system. The device includes:

a shaft, into which a pressure-bearing cylinder is movably inserted;

a sealing component, through which an outer wall of the pressure-bearing cylinder is sealed and connected to an inner wall of the shaft;

a locking component arranged at a top of the pressure-bearing cylinder to support the pressure-bearing cylinder on a ground at a top of the shaft through the locking component in case that the pressure-bearing cylinder is at a lowest limit position;

a primary gravity block arranged above the locking component;

a spherical connection component arranged and spherically connected between the primary gravity block and the locking component; in which a plurality of guide components are arranged around the primary gravity block; and a plurality of guide rails arranged on the ground and at a peripheral side of the primary gravity block; in which the plurality of guide rails cooperate with the plurality of guide components to limit a position of the primary gravity block through the plurality of guide rails.

Furthermore, the spherical connection component includes:

a spherical support seat arranged at a bottom of the primary gravity block, in which a bottom of the spherical support seat is provided with an inner spherical groove; and a spherical transition support block arranged on the locking component, in which a surface of the spherical transition support block has an outer spherical structure adapted to the inner spherical groove.

Furthermore, the system further includes a pressure-bearing transition base arranged between the primary gravity block and the spherical support seat to connect the primary gravity block and the spherical support seat.

Furthermore, the system further includes an annular locking platform arranged on a bottom edge of the spherical support seat, so that the spherical transition support block and the locking component are located inside the annular locking platform in case that the annular locking platform is supported on the ground.

Furthermore, a plurality of primary gravity blocks are provided, and the spherical support seat is arranged below a lowermost primary gravity block. The plurality of primary gravity blocks are connected with each other through connecting pieces, and the plurality of guide components are arranged on an edge of an uppermost primary gravity block and an edge of the spherical support seat.

Furthermore, a ground locking platform is provided on the ground, and the annular locking platform and the locking component are supported on the ground locking platform.

Furthermore, the pressure-bearing cylinder is filled with a plurality of secondary gravity blocks.

Furthermore, a positioning strip is arranged on an inner wall of the pressure-bearing cylinder in an axial direction, a side wall of the positioning strip is provided with a positioning chute in the axial direction, and a side wall of each secondary gravity block is provided with a positioning slider cooperated with the positioning chute.

Furthermore, a plurality of support rings are arranged on an inner wall of the pressure-bearing cylinder in an axial direction, and are arranged coaxially with the pressure-bearing cylinder.

Furthermore, the inner wall of the shaft is fixed with a steel lining, the pressure-bearing cylinder has a cylindrical structure surrounded by a steel plate, and the sealing component is connected to an inner wall of the steel lining and the outer wall of the pressure-bearing cylinder.

A bottom of the pressure-bearing cylinder has a conical structure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and/or other aspects and advantages of embodiments of the present disclosure will become apparent and more readily appreciated from the following descriptions made with reference to the drawings, in which.

REFERENCE NUMERALS

Figure 1:
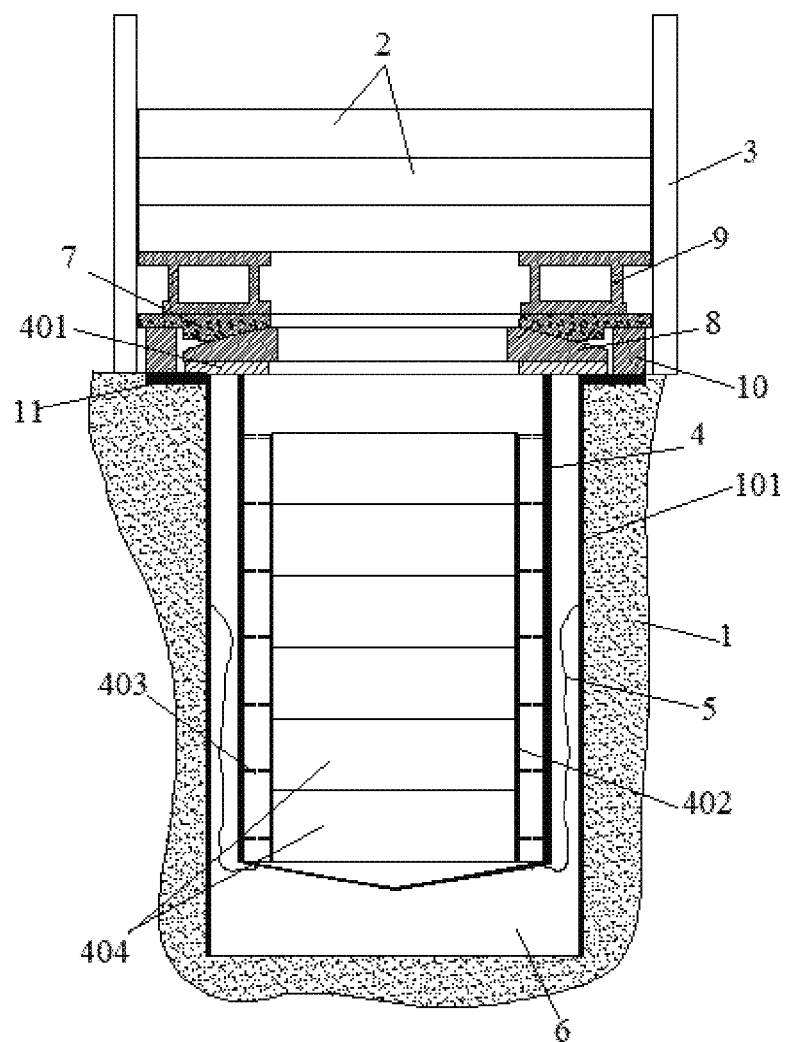
FIG. 1 is a schematic diagram showing a gravity compressed air energy storage system according to an embodiment of the present disclosure.

1: shaft; 101: steel lining; 2: primary gravity block; 3: guide rail; 4: pressure-bearing cylinder; 401: locking component; 402: positioning strip; 403: support ring; 404: secondary gravity block; 5: sealing component; 6: air storage chamber; 7: spherical support seat; 701: inner spherical groove; 8: spherical transition support block; 801: outer spherical structure; 9: pressure-bearing transition base; 91: support plant; 92: reinforcement rib; 10: annular locking platform; 11: ground locking platform.

DETAILED DESCRIPTION

Embodiments of the present disclosure are described in detail below, examples of which are illustrated in the drawings. The same or similar elements are denoted by same reference numerals in different drawings unless indicated otherwise. The embodiments described herein with reference to drawings are explanatory, and used to generally understand the present disclosure, but shall not be construed to limit the present disclosure. On the contrary, embodiments of the present disclosure include all changes, modifications, and equivalents that fall within the spirit and connotation of the appended claims.

FIG. 1 is a schematic diagram showing a gravity compressed air energy storage system having layered gravity blocks and arranged underground according to an embodiment of the present disclosure.

As shown in FIG. 1, the gravity compressed air energy storage system includes a shaft 1, a primary gravity block 2 and a plurality of guide rails 3. A pressure-bearing cylinder 4 is movably inserted into the shaft, and an outer wall of the pressure-bearing cylinder 4 is sealed and connected to an inner wall of the shaft 1 through a sealing component 5, so as to form an air storage chamber 6 in a middle of the space below the sealing component 5 by the pressure bearing cylinder 4, the sealing component 5 and the shaft 1. A locking component 401 is arranged at a top of the pressure-bearing cylinder 4 to support the pressure-bearing cylinder 4 on a ground at a top of the shaft 1 through the locking component 401 in case that the pressure-bearing cylinder 4 is at a lowest limit position. By supporting the locking component 401 on the ground, the pressure-bearing cylinder 4 is moved downwards until the locking component 401 is supported on the ground, and the pressure-bearing cylinder 4 is in the lowest limit position. At this time, there is a certain space in the air storage chamber 6, which may ensure that when sufficient compressed air is introduced into the air storage chamber 6, the pressure-bearing cylinder 4 may be lifted upwards. In addition, the locking component 401 may be a locking flange, and an outer diameter of the locking flange is greater than an inner diameter of the pressure-bearing cylinder 4.

In order to increase the gravity acting on the gas storage chamber 6, the primary gravity block 2 may be arranged above the locking component 401. The primary gravity block 2 and the pressure-bearing cylinder 4 together apply pressure to the gas storage chamber 6, which allows more compressed air energy in the gas storage chamber 6 to be partially converted into gravitational potential energy, so as to achieve more energy storage. Furthermore, the primary gravity block 2 is directly installed on the top of the locking component 401, and is located outside the ground. When achieving high energy storage, it is not needed to concentrate all gravity blocks in the shaft 1, which may reduce the height of the shaft 1, and greatly reduces the excavation quantity and engineering difficulty of the shaft 1.

In addition, a spherical connection component is arranged between the primary gravity block and the locking component 401, and spherical connection component is spherically connected the primary gravity block and the locking component 401. A plurality of guide components are arranged around the primary gravity block 2, and a plurality of guide rails 3 are arranged on the ground. Specifically, a plurality of well towers may be arranged on the ground, and the guide rails 3 are arranged on the well towers. The plurality of guide rails 3 are arranged around the primary gravity block 2, and the guide rails 3 cooperate with the guide components to limit the primary gravity block 2 through the plurality of guide rails 3. The coordination between the guide rails 3 and the guide components may prevent the primary gravity block 2 from shifting during the upward and downward movement process. Due to the spherical connection between the primary gravity block 2 and the locking component 401, during the upward and downward movement of the pressure-bearing cylinder 4, when the pressure-bearing cylinder 4 deviates, the spherical connection serves as a centering function to adapt to the posture changes of the pressure-bearing cylinder 4, which does not exert a deviating force on the primary gravity block 2, avoid significant force of the primary gravity block 2 on the guide rail 3, and prevent the primary gravity block 2 from collapsing caused by deformation and extent of the guide rail 3.

It needs to be explained in detail that the structure of the spherical connection components between the primary gravity block 2 and the locking component 401 may be various.

Figure 2:
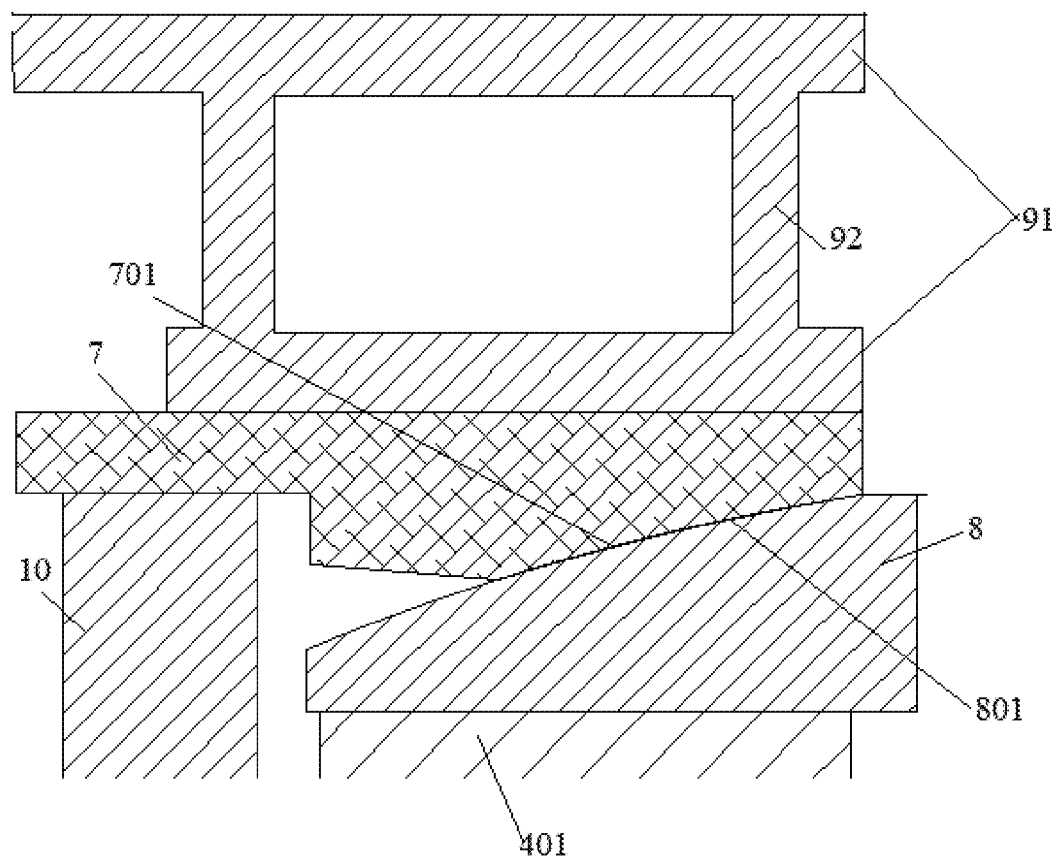
FIG. 2 is a schematic diagram showing an enlarged part in FIG. 1.

In some embodiments, the spherical connection component includes a spherical support seat 7 arranged at a bottom of the primary gravity block 2, and a spherical transition support block 8 arranged on the locking component 401. As shown in FIG. 2, a bottom of the spherical support seat 7 is provided with an inner spherical groove 701, and a surface of the spherical transition support block 8 has an outer spherical structure 801. The outer spherical structure 801 is adapted to the inner spherical groove 701 to achieve the spherical connection between the primary gravity block 2 and the locking component 401. Through the spherical fit between the outer spherical structure 801 and the inner spherical groove 701, when the pressure-bearing cylinder 4 deviates, the spherical alignment function is achieved through the spherical surfaces of the outer spherical structure 801 and the inner spherical groove 701.

In addition, the system further includes a pressure-bearing transition base 9 arranged between the primary gravity block 2 and the spherical support seat 7 to connect the primary gravity block 2 and the spherical support seat 7. As shown in FIG. 2, the pressure-bearing transition base 9 includes two parallel support plates 91 and a plurality of reinforcement ribs 92 that are connected between the two support plates. The two support plates 91 are respectively connected to the primary gravity block 2 and the spherical support seat 7. By setting the pressure-bearing transition base 9, the system may buffer the pressure of the primary gravity block 2 on the spherical support seat 7 and avoid damage to the spherical support seat 7.

In some embodiments, the system further includes an annular locking platform 10 arranged on a bottom edge of the spherical support seat 7, so that the spherical transition support block 8 and the locking component 401 are located inside the annular locking platform 10 in case that the annular locking platform 10 is supported on the ground. In this way, after hoisting and installation of the system, the primary gravity block 2, the spherical support seat 7, and the pressure bearing transition base 9 are supported on the ground through the annular locking platform 10. The spherical transition support block 8 and the locking component 401 are located inside the annular locking platform 10, and the spherical transition support block 8 is supported on the locking component 401. The spherical transition support block 8 and the spherical support seat 7 are in a separate state, with a gap between the two. At this time, the outer spherical structure 801 and the inner spherical groove 701 do not fit together. When the pressure-bearing cylinder 4 moves upwards and drives the spherical transition support block 8 to move upwards, the outer spherical structure 801 and the inner spherical groove 701 fit together and lift the primary gravity block 2, the spherical support seat 7, and the pressure-bearing transition base 9 together. The setting of the annular locking platform 10 can not only achieve support for the gravity part on the ground to avoid the direct impact of gravity on the locking component 401 caused by the above ground gravity, but also limit the position of the spherical transition support block 8, so that when the pressure-bearing cylinder 4 is offset, the spherical surface connecting the outer spherical structure 801 and the inner spherical groove 701 does not deviate. In addition, during installation, the pressure-bearing cylinder 4 is first lifted into the shaft 1. The pressure-bearing cylinder 4 is supported on the ground at the top of the shaft 1 through the locking component 401 at the top, and the spherical transition support block 8 is installed on the locking component 401. The annular locking platform 10 is lifted to the designated position on the ground, so that the locking component 401 and the spherical transition support block 8 are located inside the annular locking platform 10. The spherical support seat 7 is installed on the annular locking platform 10, which may ensure position and orientation of the inner spherical groove 701. The pressure-bearing transition base 9 is installed on the spherical support seat 7, and the primary gravity block 2 is installed on the pressure-bearing transition base 9. The setting of the annular locking platform 10 may ensure the stability of various components on the ground during installation.

In detail, the gas storage chamber 6 is connected to an air compressor unit and an air expansion unit. When storing gas, the excess power is driven by an electric motor to work on the air compressor unit, and the compressed air obtained is introduced into the gas storage chamber 6. The pressure of the compressed air in the gas storage chamber 6 drives the pressure-bearing cylinder 4 to move upward, and the pressure-bearing cylinder 4 moves upward to make the outer spherical structure 801 and the inner spherical groove 701 fit together and continues to increase as the pressure of the compressed air. After increasing to a certain extent, the pressure-bearing cylinder 4 continues to move upwards to drive the primary gravity block 2, the spherical support seat 7, and the pressure-bearing transition base 9 to move upwards together, so as to achieve partial conversion of compressed air potential energy into gravity potential energy. The spherical support seat 7, the spherical transition support block 8, and the pressure-bearing transition base 9 themselves have a large weight and may also provide partial gravity. During energy release, the compressed air in the air storage chamber 6 is introduced into the air expansion unit to generate power. The pressure-bearing cylinder 4 and the components on the ground move downwards together until the circular locking platform 10 contacts the ground, and the locking component 401 moves downwards to contact the ground, so as to limit the pressure-bearing cylinder 4, so that the pressure-bearing cylinder 4 will not move downwards.

In some embodiments, a plurality of primary gravity blocks 2 are provided, and the spherical support seat 7 is arranged on the lowest primary gravity block 2. By setting the plurality of primary gravity blocks 2, gravity may be increased while dispersing through the plurality of the primary gravity blocks 2, which increases energy storage and facilitates lifting. When the plurality of the primary gravity blocks 2 are installed, the primary gravity blocks 2 may be connected through connectors, such as bolted connection. The levelness between the blocks needs to be adjusted, so that the plurality of the guide components may be set on a side of the top most primary gravity block 2 and the side of the spherical support seat 7. As the plurality of the primary gravity blocks 2 are connected to the spherical transition support block 8, the pressure-bearing crossover base 9 and the circular locking platform 10, all of which may form aboveground gravity components, and only one guide component needs to be set on the side of the top level gravity block 2 and one guide component needs to be set on the side of the spherical support seat 7. In this way, the top and bottom of the entire aboveground gravity component may be guided through the guide rail, which reduces the use of the guide component and facilitating installation. In addition, through the guidance function of the guide component, centers of gravity of the plurality of the primary gravity blocks 2, the spherical transition support blocks 8, the pressure bearing transition base 9 and the annular locking platform 10 may be guaranteed to remain consistent with each other, and on an axis of the pressure-bearing cylinder 4. At the same time, the center of gravity of the pressure-bearing cylinder 4 is also on the axis, which effectively prevent the center of gravity from shifting during movement.

In some embodiments, a ground locking platform 11 is provided on the ground, with the annular locking platform 10 and the locking component 401 supported on the ground locking platform 11. The ground locking platform 11 may be pre embedded with steel plates, and an upper surface of the ground locking platform 11 is machined, leveled and grouted to ensure the horizontal accuracy of the ground locking platform 11 and the locking bearing capacity of the ground locking platform 11.

In some embodiments, in order to fully utilize the space in the pressure-bearing cylinder 4, a plurality of secondary gravity blocks 404 are filled in the pressure-bearing cylinder 4, which not only saves space, but also increases the gravity acting on the gas storage chamber 6. At the same time, the pressure-bearing cylinder 4 is made into a cylindrical structure and then filled with the secondary gravity blocks 404, which reduces the weight of a single lifting and reducing the difficulty of lifting.

In addition, the inner wall of the pressure-bearing cylinder 4 is equipped with a positioning strip 402 in an axial direction, and a side wall of the positioning strip is provided with a positioning guide groove in the axial direction. The side wall of the secondary gravity block 404 is equipped with a positioning slider cooperated with the positioning guide groove. The setting of the positioning guide groove may ensure that a center of gravity of the plurality of the secondary gravity blocks 404 is consistent with each other, and both the center of gravity of the pressure-bearing cylinder 4 are on the axis of the pressure bearing cylinder 4. Furthermore, it ensures that the center of gravity of the entire pressure-bearing cylinder 4 is on the axis. During upward and downward movement of the pressure-bearing cylinder 4, the center of gravity will not shift due to the limiting effect of the positioning guide groove, and the pressure-bearing cylinder 4 will not displace due to the center of gravity shift.

In some embodiments, a plurality of support rings 403 are arranged along the axial direction on the inner wall of the pressure-bearing cylinder 4. The plurality of support rings 403 are arranged on the same axis as the pressure-bearing cylinder 4, and the positioning strip 402 is arranged on the support ring 403. Due to a cylindrical hollow structure of the pressure-bearing cylinder 4, the performance strength of the pressure-bearing cylinder 4 may be improved through the action of the plurality of support rings 403.

In some embodiments, the inner wall of the shaft 1 is fixed with a steel lining 101, and the pressure-bearing cylinder 4 has a cylindrical structure surrounded by a steel plate. The sealing component 5 is connected to the inner wall of the steel lining 101 and the outer wall of the pressure-bearing cylinder 4. By setting the steel lining 101, the inner wall of the shaft 1 may be ensured to be smooth. Moreover, the pressure-bearing cylinder 4 has the cylindrical structure surrounded by the steel plates, which also has a smooth outer wall structure. Furthermore, when the sealing component 5 is fixed on the steel lining 101 and the pressure-bearing cylinder 4, the sealing performance may be improves, and it facilitates the installation of the sealing component 5. At the same time, since the energy storage pressure in the air storage chamber 6 is about 10 MPa, and the gravity block is generally made of concrete, air leakage may occur under the action of high-pressure air. By setting the pressure-bearing cylinder 4 to wrap it outside the plurality of the secondary gravity blocks 404, the air tightness may be improved and air leakage may be prevented. In addition, the aboveground gravity components are arranged on the ground, which reduces the height of shaft 1, so that it facilitates the construction and installation of steel lining 101. The structure of the sealing component 5 is an existing structure and will not be described here.

In addition, a bottom of the pressure-bearing cylinder 4 has a conical structure, which makes the bottom of the pressure-bearing cylinder 4 more evenly stressed in a high-pressure environment without deformation.

It should be noted that in the description of the present disclosure, terms such as "first" and "second" are used for description purposes only, and should not be understood as indicating or implying relative importance. In addition, in the description of the present application, unless otherwise specified, "a plurality of" means two or more than two, unless specified otherwise.

Any process or method described in a flowchart or described herein in other ways may be understood to include one or more modules, segments or portions of codes of executable instructions for achieving specific logical functions or steps in the process, and the scope of the embodiments of the present disclosure includes other implementations, in which functions may be performed out of an order shown or discussed, including in substantially simultaneous fashion or in reverse order depending on the functions involved, which shall be understood by those skilled in the art to which the embodiments of the present disclosure belong.

In the description of the specification, descriptions referring to the terms "an embodiment", "some embodiments", "an example", "a specific example", or "some examples" mean that specific features, structures, materials or characteristics described in connection with embodiments or examples are included in at least one embodiment or example of the present disclosure. In this specification, schematic representations of the above terms do not necessarily refer to the same embodiment or example. Furthermore, the specific features, structures, materials or characteristics described may be combined in any suitable manner in any one or more embodiments or examples.

Although the embodiments of the present application have been shown and described above, it is understood that the above embodiments are illustrative and should not be construed as limitations on the present disclosure, and those skilled in the art may make the above-mentioned embodiments are subject to changes, modifications, substitutions and variations.

What is claimed is:

1. A gravity compressed air energy storage system, comprising:
    a shaft, into which a pressure-bearing cylinder is movably inserted;
    a sealing component, through which an outer wall of the pressure-bearing cylinder is sealed and connected to an inner wall of the shaft;
    a locking component arranged at a top of the pressure-bearing cylinder to support the pressure-bearing cylinder on a ground at a top of the shaft through the locking component in case that the pressure-bearing cylinder is at a lowest limit position;
    a primary gravity block arranged above the locking component;
    a spherical connection component arranged and spherically connected between the primary gravity block and the locking component, and comprising:
        a spherical support seat arranged at a bottom of the primary gravity block; and
        a spherical transition support block arranged on the locking component;
        wherein a bottom of the spherical support seat is provided with an inner spherical groove, and a surface of the spherical transition support block has an outer spherical structure adapted to the inner spherical groove;
    an annular locking platform arranged on a bottom edge of the spherical support seat, so that the spherical transition support block and the locking component are located inside the annular locking platform in case that the annular locking platform is supported on the ground, and the spherical transition support block and the spherical support seat are in a separated state and define a gap therebetween after hoisting is completed; and
    a plurality of guide rails arranged on the ground and at a peripheral side of the primary gravity block; wherein a plurality of guide components are arranged around the primary gravity block, and the plurality of guide rails cooperate with the plurality of guide components to limit a position of the primary gravity block through the plurality of guide rails.

2. The system according to claim 1, further comprising:
    a pressure-bearing transition base arranged between the primary gravity block and the spherical support seat to connect the primary gravity block and the spherical support seat.

3. The system according to claim 1, wherein a plurality of primary gravity blocks are provided, and the spherical support seat is arranged below a lowermost primary gravity block;

the plurality of primary gravity blocks are connected with each other through connecting pieces, and the plurality of guide components are arranged on an edge of an uppermost primary gravity block and an edge of the spherical support seat.

4. The system according to claim 1, wherein a ground locking platform is provided on the ground, and the annular locking platform and the locking component are supported on the ground locking platform.

5. The system according to claim 1, wherein the pressure-bearing cylinder is filled with a plurality of secondary gravity blocks.

6. The system according to claim 5, wherein a positioning strip is arranged on an inner wall of the pressure-bearing cylinder in an axial direction, a side wall of the positioning strip is provided with a positioning chute in the axial direction, and a side wall of each secondary gravity block is provided with a positioning slider cooperated with the positioning chute.

7. The system according to claim 1, wherein a plurality of support rings are arranged on an inner wall of the pressure-bearing cylinder in an axial direction, and are arranged coaxially with the pressure-bearing cylinder.

8. The system according to claim 1, wherein the inner wall of the shaft is fixed with a steel lining, the pressure-bearing cylinder has a cylindrical structure surrounded by a steel plate, and the sealing component is connected to an inner wall of the steel lining and the outer wall of the pressure-bearing cylinder;

a bottom of the pressure-bearing cylinder has a conical structure.

\* \* \* \* \*